United States Patent
Okamoto

(10) Patent No.: US 7,561,213 B2
(45) Date of Patent: Jul. 14, 2009

(54) TELEVISION BROADCAST RECEIVER

(75) Inventor: Kenji Okamoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 665 days.

(21) Appl. No.: 11/288,137

(22) Filed: Nov. 29, 2005

(65) Prior Publication Data

US 2006/0143673 A1 Jun. 29, 2006

(51) Int. Cl.
*H04N 5/50* (2006.01)
*H04N 5/268* (2006.01)
*H01Q 3/24* (2006.01)

(52) U.S. Cl. .............. 348/725; 348/569; 348/570; 348/706; 348/731; 343/876; 725/72

(58) Field of Classification Search ........... 348/569, 348/570, 705, 706, 725, 731; 343/818, 876, 343/879
See application file for complete search history.

(56) References Cited

U.S. PATENT DOCUMENTS

| | | | | |
|---|---|---|---|---|
| 5,335,010 A * | 8/1994 | Lindemeier et al. | ........ | 348/706 |
| 5,561,673 A * | 10/1996 | Takai et al. | ........ | 714/708 |
| 5,818,389 A * | 10/1998 | Lazar | ........ | 342/383 |
| 5,818,543 A * | 10/1998 | Lee | ........ | 348/725 |
| 5,844,632 A * | 12/1998 | Kishigami et al. | ........ | 348/706 |
| 5,907,371 A * | 5/1999 | McNay et al. | ........ | 348/706 |
| 5,966,186 A * | 10/1999 | Shigihara et al. | ........ | 348/570 |
| 6,310,661 B1 * | 10/2001 | Arsenault | ........ | 348/725 |
| 6,389,070 B1 * | 5/2002 | Cugnini et al. | ........ | 375/232 |
| 6,577,353 B1 * | 6/2003 | Welles et al. | ........ | 348/706 |
| 6,580,492 B2 * | 6/2003 | Fujimoto | ........ | 355/52 |
| 6,757,267 B1 * | 6/2004 | Evans et al. | ........ | 370/334 |
| 6,792,258 B1 * | 9/2004 | Nokes et al. | ........ | 455/277.2 |
| 6,867,819 B2 * | 3/2005 | Lee | ........ | 348/725 |
| 7,019,791 B2 * | 3/2006 | Yoshizawa et al. | ........ | 348/738 |
| 7,034,893 B2 * | 4/2006 | Liu et al. | ........ | 348/614 |
| 7,061,542 B1 * | 6/2006 | Ikeguchi | ........ | 348/558 |
| 7,106,382 B2 * | 9/2006 | Shiotsu | ........ | 348/555 |
| 7,116,959 B1 * | 10/2006 | Link et al. | ........ | 455/277.1 |
| 7,136,113 B2 * | 11/2006 | Lee | ........ | 348/725 |
| 7,215,382 B2 * | 5/2007 | Bennett | ........ | 348/570 |
| 7,242,424 B2 * | 7/2007 | Lee | ........ | 348/180 |

(Continued)

FOREIGN PATENT DOCUMENTS

JP 3035217 U 12/1996

(Continued)

*Primary Examiner*—Brian P Yenke
(74) *Attorney, Agent, or Firm*—Crowell & Moring LLP

(57) ABSTRACT

For determining connection of a TV broadcast receiver for receiving terrestrial broadcasts to a smart antenna with multiple receiving directions having a current active receiving direction, the receiver sends, to the connected antenna, a control signal to change the current active receiving direction to a further active receiving direction, so as to determine that a smart antenna is connected to the receiver if intensity of a television broadcast signal received and measured in the further active receiving direction is significantly varied from that in the current receiving direction. If the intensity of the television broadcast signal in the further active receiving direction is not significantly varied, the receiver determines that a smart antenna is disconnected from the receiver, and displays a message indicating the disconnection to a user. Thus, this receiver can automatically determine the kind of connected antenna, and display information about the connected antenna to the user.

2 Claims, 6 Drawing Sheets

U.S. PATENT DOCUMENTS

| | | | |
|---|---|---|---|
| 7,295,825 B2* | 11/2007 | Raddant | 455/277.1 |
| 7,369,823 B2* | 5/2008 | Oiwa | 455/135 |
| 7,397,516 B2* | 7/2008 | Tsukamoto | 348/725 |
| 7,408,593 B2* | 8/2008 | Narita | 348/725 |
| 7,420,627 B2* | 9/2008 | Takagi et al. | 348/725 |
| 2001/0046271 A1* | 11/2001 | Jonas et al. | 375/347 |
| 2002/0163593 A1* | 11/2002 | Liu et al. | 348/614 |
| 2003/0228857 A1* | 12/2003 | Maeki | 455/278.1 |
| 2004/0105031 A1* | 6/2004 | Shibusawa | 348/570 |
| 2004/0128689 A1* | 7/2004 | Pugel et al. | 725/72 |
| 2004/0136406 A1* | 7/2004 | Kuramoto | 370/503 |
| 2004/0248517 A1* | 12/2004 | Reichgott et al. | 455/63.4 |
| 2004/0252244 A1* | 12/2004 | Bae et al. | 348/725 |
| 2005/0034173 A1* | 2/2005 | Hatanaka | 725/151 |
| 2005/0240969 A1* | 10/2005 | Sasaki et al. | 725/72 |
| 2005/0287968 A1* | 12/2005 | Takagi et al. | 455/179.1 |
| 2006/0003747 A1* | 1/2006 | Kolakowski | 455/414.1 |
| 2006/0010473 A1* | 1/2006 | Takagi et al. | 725/72 |
| 2006/0010474 A1* | 1/2006 | Tsukamoto | 725/72 |
| 2006/0028586 A1* | 2/2006 | Onomatsu | 348/725 |
| 2006/0038923 A1* | 2/2006 | Dinwiddie | 348/569 |
| 2006/0055831 A1* | 3/2006 | Onomatsu | 348/725 |
| 2006/0209217 A1* | 9/2006 | Onomatsu et al. | 348/732 |
| 2007/0011719 A1* | 1/2007 | Lin | 725/139 |

FOREIGN PATENT DOCUMENTS

JP     10-302 U     12/1998

* cited by examiner

TELEVISION BROADCAST RECEIVER

BACKGROUND OF THE INVENTION

1. Field of the Invention

The present invention relates to a television broadcast receiver for receiving terrestrial broadcasts.

2. Description of the Related Art

Conventionally, directional antennas such as a Yagi antenna are used to receive terrestrial broadcasts. A directional antenna has a high directivity to be able to receive a weak radio wave or signal. At the same time, the directional antenna has a drawback that it can receive only a radio wave coming from one direction. This is not a big problem in countries like Japan where many broadcast towers are concentrated in one location. However, in countries like the United States of America, there are many areas where broadcast towers spread around cities. If a directional antenna such as a Yagi antenna is used in such case, it may occur that the directional antenna cannot receive many broadcasts from broadcast towers even if the directional antenna is placed close to the broadcast towers.

In order to solve such problem, the EIA (Electronic Industries Association)-909 standard "Antenna Control Interface" was instituted, which provides a technology that a television broadcast receiver can control and change active receiving directions of the antenna. More specifically, it is a standard to connect, to a television (TV) broadcast receiver, a so-called smart antenna which is capable of changing active receiving directions, and to control the antenna by the TV broadcast receiver via a modular terminal. In the present specification, the two kinds of antennas are distinguished by referring to the directional antenna, such as the Yagi antenna, as a unidirectional antenna, and by referring to the antenna capable of changing its active receiving directions as a multi-directional antenna.

FIG. 7A is a schematic block diagram of an example of a conventional TV broadcast receiver 101 correctly or normally connected to a smart antenna 102 conforming to the EIA-909 standard. In order to connect the TV broadcast receiver 101 to the smart antenna 102, the TV broadcast receiver 101 has an RF terminal 111a connected via an RF cable 41 to an RF terminal 122b of an antenna controller 122 of the smart antenna 102, and also has a modular terminal 117 connected via a modular cable 42 to a modular terminal 122a of the antenna controller 122. In the case where the smart antenna 102 has an antenna unit 121 as a separate element from the antenna controller 122 as shown in FIG. 7A, an additional RF cable 43 is used to connect between the antenna unit 121 and an RF terminal 122c provided in the antenna controller 122 for antenna connection. The TV broadcast receiver 101 receives TV broadcast signals via the RF terminal 111a, and communicates e.g. control signals via the modular terminal 117. The antenna controller 122 receives control signals from the TV broadcast receiver 101 via the modular terminal 122a, and changes or switches active receiving directions of the antenna unit 121 on the basis of the thus received control signals.

In such antenna connection, correct connection of cables is important. For example, electric power for driving the antenna unit 121 and the antenna controller 122 of the smart antenna 102 is transferred along with the control signals to the antenna controller 122 via the modular cable 42, and is supplied to the antenna unit 121 via the RF cable 43. However, if a user makes a mistake and connects the RF cable 41 to the RF terminal 122c for antenna connection, and further connects the RF cable 43 to the RF terminal 122b for TV broadcast receiver connection as shown in FIG. 7B, it becomes impossible to supply electric power to the antenna unit 121 for switching between active receiving directions of the antenna unit 121 on the basis of the control signals.

Even if the user makes a mistake in connecting the RF cables 41 and 43 in the above-described way, however, it may be difficult for the user to be aware of the mistake in the connections, since it may be possible for the TV broadcast receiver 101 to receive a TV broadcast signal of a channel to be received in an active receiving direction of the antenna unit 121. Note in this connection that each of Japanese Registered Utility Model 3035217 and Japanese Laid-open Utility Model Publication Hei 10-302 discloses an example of an antenna device with an electric circuit designed to be able to detect connections between an antenna or the like and a controller or the like.

On the other hand, the EIA-909 standard provides a Mode A to enable one-way communication from a TV broadcast receiver to an antenna as well as a Mode B to enable two-way communication between a TV broadcast receiver and an antenna. A TV broadcast receiver for the Mode B can provide higher performance, using the two-way communication, by determining a specific protocol to be used between the TV broadcast receiver and the smart antenna. Note here that a TV broadcast receiver conforming to the EIA-909 standard can send such a control signal that allows a response signal to be sent back to the TV broadcast receiver if a smart antenna for the Mode B is connected to the TV broadcast receiver, without a response signal being sent back if a smart antenna for the Mode B is disconnected from or not connected to the TV broadcast receiver, so as to determine, based on the response signal, whether or not a smart antenna for the Mode B is connected thereto.

A conventional TV broadcast receiver, however, cannot determine whether or not a multi-directional antenna is correctly or normally connected thereto, although the TV broadcast receiver can determine whether it is connected to a multi-directional antenna capable of the one-way communication (smart antenna for the Mode A), or a multi-directional antenna capable of the two-way communication (smart antenna for the Mode B). Furthermore, the conventional TV broadcast receiver cannot determine whether or not the multi-directional antenna is adapted to a predetermined function which the TV broadcast receiver provides by using the two-way communication. Thus, a user cannot recognize whether a multi-directional antenna is correctly connected to a TV broadcast receiver, and cannot recognize whether the multi-directional antenna is adapted to a predetermined function provided by the TV broadcast receiver.

SUMMARY OF THE INVENTION

It is a first object of the present invention to provide a television broadcast receiver that can determine whether or not a multi-directional antenna is correctly connected to the television broadcast receiver, and, if not, can notify it to a user.

It is a second object of the present invention to provide a television broadcast receiver that can determine whether or not a multi-directional antenna is adapted to a predetermined function provided by the television broadcast receiver, and, if not, can notify it to a user.

According to a first aspect of the present invention, the first object of the present invention is achieved by a television broadcast receiver comprising: a television broadcast signal receiving unit connected via an RF terminal to a unidirectional antenna having a single receiving direction, or to a multi-directional antenna having multiple receiving directions, for receiving a television broadcast signal; a control signal communication unit connected via a control signal input/output terminal to an antenna controller of the multi-directional antenna for sending a control signal to the antenna controller, and for receiving a response signal from the antenna controller in response to the control signal, in which the antenna controller is provided to change an active receiving direction of the multi-directional antenna; a first antenna connection identification unit for identifying the kind of antenna connected to the RF terminal and/or the control signal input/output terminal, whether multi-directional antenna capable of the two-way communication or not, by communication using the control signal communication unit to send a first antenna identification signal to the antenna controller of the connected antenna which sends back a response signal if a multi-directional antenna capable of the two-way communication is connected to the television broadcast signal receiving unit, so as to determine that the multi-directional antenna capable of the two-way communication is connected to the television broadcast signal receiving unit if the first antenna connection identification unit receives the response signal, and to determine that the multi-directional antenna capable of the two-way communication is disconnected from the television broadcast signal receiving unit if the first antenna connection identification unit does not receive the response signal; a second antenna connection identification unit for identifying whether or not a multi-directional antenna capable of one-way communication and having a current active receiving direction is connected to the television broadcast signal receiving unit if the first antenna connection identification unit identifies that the multi-directional antenna capable of the two-way communication is disconnected from the television broadcast signal receiving unit, in which the second antenna connection identification unit performs the identification by communication using the control signal communication unit to send, to the connected antenna, a control signal to change the current active receiving direction of the multi-directional antenna to a further active receiving direction, so as to determine that the multi-directional antenna capable of the one-way communication is connected to the television broadcast signal receiving unit if intensity of a television broadcast signal received and measured in the further active receiving direction is significantly varied from that in the current receiving direction, and to determine that the multi-directional antenna capable of the one-way communication is disconnected from the television broadcast signal receiving unit if the intensity of the television broadcast signal received and measured in the further active receiving direction is not significantly varied from that in the current receiving direction; and a message display unit for displaying, to a user, a message indicating that a multi-directional antenna is disconnected from the television broadcast signal receiving unit if the identification by the first antenna connection identification unit and the second antenna connection identification unit indicates that the kind of antenna connected to the television broadcast signal receiving unit is not a multi-directional antenna.

According to the first aspect of the present invention, the first antenna connection identification unit and the second antenna connection identification unit identify whether or not a multi-directional antenna is connected to the television broadcast receiver. If these two units identify that the kind of connected antenna is not a multi-directional antenna, the message display unit displays, to a user, a message indicating that a multi-directional antenna is disconnected from the television broadcast receiver. Thus, the user can easily recognize the kind of connected antenna.

Preferably, the television broadcast receiver further comprises an antenna control unit for sending, to the antenna controller, a control signal for each multi-directional antenna using the control signal communication unit on the basis of the kind of multi-directional antenna as identified by the first antenna connection identification unit and the second antenna connection identification unit, so as to control the each identified multi-directional antenna. The use of the antenna control unit makes it possible that in addition to the effect obtained by the first aspect of the present invention as described above, the television broadcast receiver can properly control each multi-directional antenna according to the kind of multi-directional antenna, when receiving terrestrial broadcast.

According to a second aspect of the present invention, the second object of the present invention is achieved by a television broadcast receiver comprising: a television broadcast signal receiving unit connected via an RF terminal to a uni-directional antenna having a single receiving direction, or to a multi-directional antenna having multiple receiving directions, for receiving a television broadcast signal; a control signal communication unit connected via a control signal input/output terminal to an antenna controller of the multi-directional antenna for sending a control signal to the antenna controller, and for receiving a response signal from the antenna controller in response to the control signal, in which the antenna controller is provided to change receiving direction of the multi-directional antenna; a first antenna connection identification unit for identifying the kind of antenna connected to the RF terminal and/or the control signal input/output terminal, whether multi-directional antenna capable of the two-way communication or not, by communication using the control signal communication unit to send a first antenna identification signal to the antenna controller of the connected antenna which sends back a response signal to the first antenna identification signal if a multi-directional antenna capable of the two-way communication is connected to the television broadcast signal receiving unit, so as to determine that the multi-directional antenna capable of the two-way communication is connected to the television broadcast signal receiving unit if the first antenna connection identification unit receives the response signal, and to determine that the multi-directional antenna capable of the two-way communication is disconnected from the television broadcast signal receiving unit if the first antenna connection identification unit does not receive the response signal; a second antenna connection identification unit for identifying whether or not a multi-directional antenna capable of one-way communication and having a current active receiving direction is connected to the television broadcast signal receiving unit if the first antenna connection identification unit identifies that the multi-directional antenna capable of the two-way communication is disconnected from the television broadcast signal receiving unit, in which the second antenna connection identification unit performs the identification by communication using the control signal communication unit to send, to the connected antenna, a control signal to change the current active receiving direction of the multi-directional antenna to a further active receiving direction, so as to determine that the multi-directional antenna capable of the one-way communication is connected to the television broadcast signal receiving unit if intensity of a television broadcast signal received and measured in the further active receiving direction is significantly varied from that in the current receiving direction, and to determine that the multi-directional antenna capable of the one-way communication is disconnected from the television broadcast signal receiving unit if the intensity of the television broadcast signal received and measured in the further active receiving direction is not significantly varied from that in the current receiving direction; a third antenna connection identification unit for identifying whether or not the multi-directional antenna capable of the two-way communication is adapted to a predetermined function provided by the television broadcast receiver by using the two-way communication if the first antenna connection identification unit identifies that the multi-directional antenna of the two-way communication is connected to the television broadcast signal receiving unit, in which the third antenna connection identification unit performs the identification by communication using the control signal communication unit to send a second antenna identification signal to the antenna controller of the connected multi-directional antenna which sends back a response signal to the second antenna identification signal if the connected multi-directional antenna is adapted to the predetermined function, so as to determine that the multi-directional antenna capable of the two-way communication and adapted to the predetermined function is connected to the television broadcast signal receiving unit if the third antenna connection identification unit receives the response signal, and to determine that the multi-directional antenna capable of the two-way communication and adapted to the predetermined function is disconnected from the television broadcast signal receiving unit if the third antenna connection identification unit does not receive the response signal; a first message display unit for displaying, to a user, a message indicating that a multi-directional antenna is disconnected from the television broadcast signal receiving unit if the identification by the first antenna connection identification unit and the second antenna connection identification unit indicates that the kind of antenna connected to the television broadcast signal receiving unit is not a multi-directional antenna; a second message display unit for displaying, to a user, a message indicating that a multi-directional antenna capable of the two-way communication and adapted to the predetermined function is disconnected from the television broadcast signal receiving unit if the identification by the third antenna connection identification unit indicates that the kind of antenna connected to the television broadcast signal receiving unit is not a multi-directional antenna capable of the two-way communication and adapted to the predetermined function; and an antenna control unit for sending, to the antenna controller, a control signal for each multi-directional antenna using the control signal communication unit on the basis of the kind of multi-directional antenna as identified by the first antenna connection identification unit, the second antenna connection identification unit and the third antenna connection identification unit, so as to control the each identified multi-directional antenna.

According to the second aspect of the present invention, the first antenna connection identification unit and the second antenna connection identification unit identify whether or not a multi-directional antenna is connected to the television broadcast receiver. If these two units identify that the kind of connected antenna is not a multi-directional antenna, the first message display unit displays, to a user, a message indicating that a multi-directional antenna is disconnected from the television broadcast receiver. Thus, the user can easily recognize the kind of connected antenna. Here, if the television broadcast receiver displays a message indicating that a multi-directional antenna is disconnected from the television broadcast receiver even though a multi-directional antenna is actually connected to the television broadcast receiver, the user can thereby recognize that the multi-directional antenna is not correctly corrected or incorrectly connected.

Further, the third antenna connection identification unit identifies whether or not the connected multi-directional antenna is adapted to the predetermined function provided by the television broadcast receiver. If it identifies that the connected multi-directional antenna is not adapted to the predetermined function, the second message display unit displays the non-adaptation to the user. Thus, the user can easily recognize whether or not the connected multi-directional antenna is adapted to the function provided by the television broadcast receiver.

Furthermore, the television broadcast receiver comprises the antenna control unit for sending, to the antenna controller, a control signal for each multi-directional antenna using the control signal communication unit on the basis of the kind of multi-directional antenna as identified by the first antenna connection identification unit, the second antenna connection identification unit and the third antenna connection identification unit, so as to control the each identified multi-directional antenna. Accordingly, the television broadcast receiver can properly control each identified multi-directional antenna according to the kind of the identified multi-directional antenna, when receiving terrestrial broadcast.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

The best modes and preferred embodiments of the present invention will be described hereinafter with reference to the annexed drawings. Note that the specific embodiments described are not intended to cover the entire scope of the present invention, and hence the present invention is not limited to only the specific embodiments.

Figure 1:
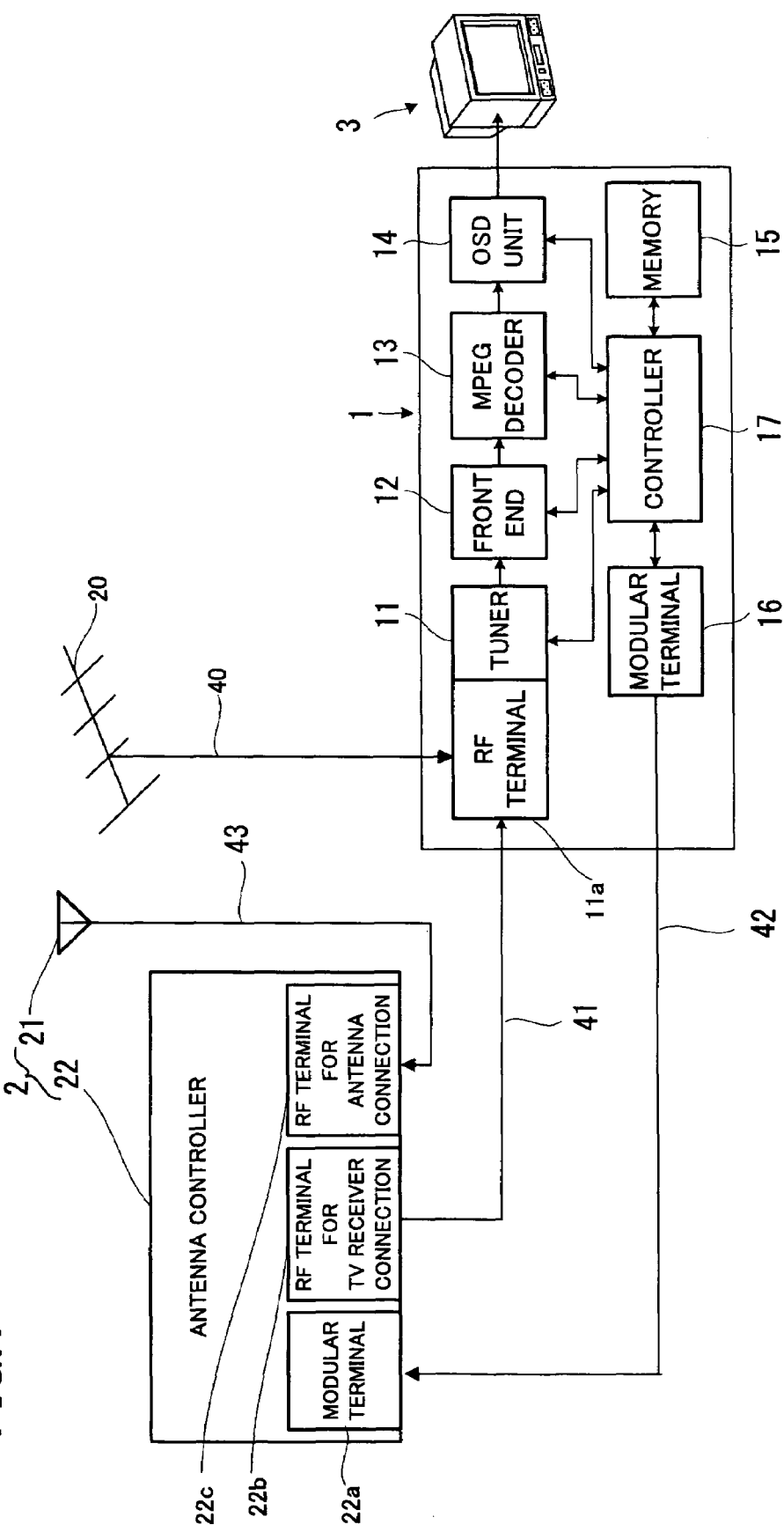
FIG. 1 is a schematic block diagram showing a TV broadcast receiver 1 according to an embodiment of the present invention.

FIG. 1 is a schematic block diagram showing a television (TV) broadcast receiver 1 according to an embodiment of the present invention. Referring to FIG. 1, the TV broadcast receiver 1 is connected to a Yagi antenna (claimed "unidirectional antenna having a single receiving direction") 20 and a smart antenna (claimed "multi-directional antenna having multiple receiving directions") 2, and receives each TV broadcast signal transmitted in a given frequency band from each broadcast station (or broadcast tower) so as to output a television program contained in the TV broadcast signal of each channel to a monitor 3. Note that in the description of the present embodiment, a physical channel that is a frequency band of carrier wave used for broadcast of a TV program is referred to simply as "channel".

The TV broadcast receiver 1 comprises: a tuner 11 connected to each antenna for receiving each TV broadcast signal; a front end 12 for subjecting the TV broadcast signal received by the tuner 11 to predetermined signal processing so as to decode the received TV broadcast signal; an MPEG (Motion Picture Experts Group) decoder 13 for decoding the TV broadcast signal which is an MPEG-compressed signal; an on-screen display (OSD) unit 14 for superimposing a signal of a predetermined display image on the decoded TV broadcast signal to produce a combined signal and outputting the combined signal to the monitor 3; a memory 15 for storing various information; a modular terminal (claimed "control signal input/output terminal") 16 connected to a modular terminal 22a of an antenna controller 22 via a modular cable 42; and a controller 17 for controlling the entire TV broadcast receiver 1. The smart antenna 2 comprises an antenna unit 21 and the antenna controller 22.

Figure 7A:
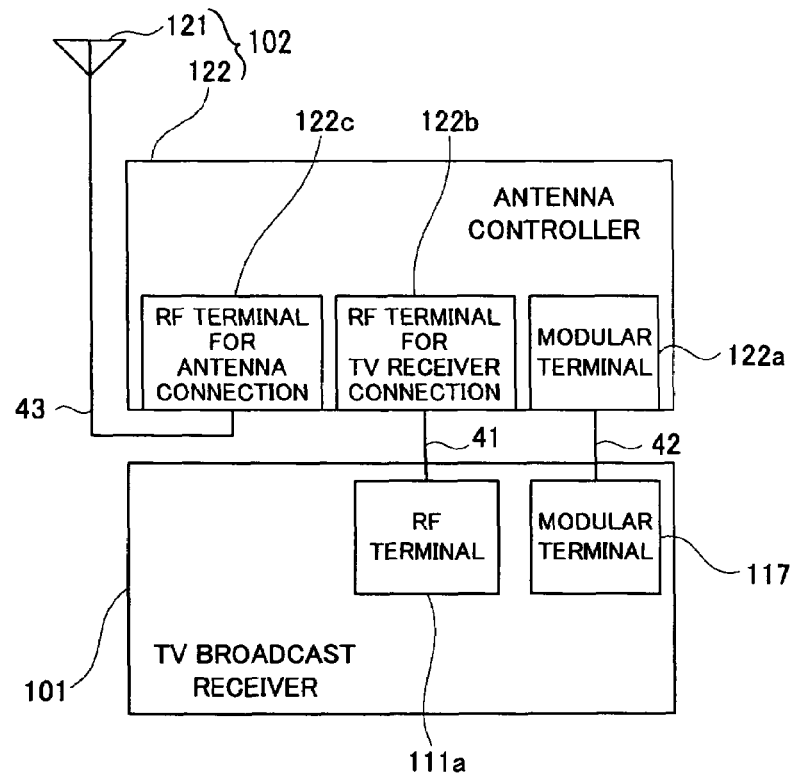
FIG. 7A is a schematic block diagram of an example of a conventional TV broadcast receiver correctly connected to a smart antenna.
Figure 7B:
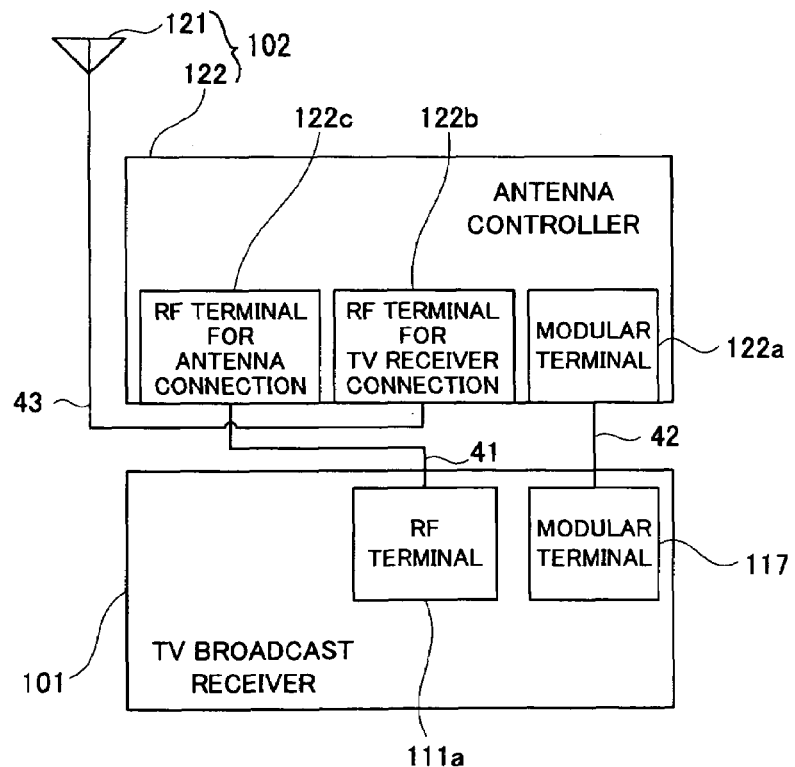
FIG. 7B is a schematic block diagram of the conventional TV broadcast receiver incorrectly connected to the smart antenna.

The tuner (claimed "television broadcast signal receiving unit") 11 has an RF (Radio Frequency) terminal 11a, and is connected via the RF terminal 11a to the Yagi antenna 20 via an RF cable 40 and to the smart antenna 2 via an RF cable 41 for receiving TV broadcast signals. Under the control of the controller 17, the tuner 11 selects a desired channel from TV broadcast signals received by either one of the two antennas 20 and 2. Thus, similarly as in the TV broadcast receiver 101 as shown in FIG. 7A, the TV broadcast receiver 1 is connected to the smart antenna 2 by connecting the RF terminal 11a of the tuner 11 via the RF cable 41 to an RF terminal 22b of the antenna controller 22 for TV broadcast receiver connection, and by connecting the modular terminal 16 via the modular cable 42 to the modular terminal 22a of the antenna controller 22. Further, the antenna unit 21 is provided as a separate element from the antenna controller 22 so that an additional RF cable 43 is used to connect between the antenna unit 21 and an RF terminal 22c provided in the antenna controller 22 for antenna connection.

The controller 17 controls the tuner 11 to measure the intensity of each received TV broadcast signal, and determines whether or not the thus measured intensity of each received TV broadcast signal is equal to or higher than (not lower than) a predetermined value. Further, under the control of the controller 17, the front end 12 subjects a TV broadcast signal of a channel selected by the tuner 11 to error correction, and separates a video stream containing necessary TS (Transport Stream) packets from a multiplexed signal, and further supplies necessary TS packets to respective blocks and units in the TV broadcast receiver 1. The MPEG decoder 13 decodes the video stream separated by the front end 12 into a video signal, and outputs the thus obtained video signal to the monitor 3 via the OSD unit 14.

The OSD unit 14 serves as a claimed first message display unit (or simply "message display unit" in claim 1) for displaying, to a user, a message indicating that the smart antenna 2 is disconnected from or not connected to the TV broadcast receiver 1 (more specifically the tuner 11), if the controller 17 determines the kind of the connected antenna not to be the smart antenna 2 by performing an antenna connection determination process including a Mode A antenna connection determining process which are described later. The OSD unit 14 also serves as a claimed second message display unit for displaying, to the user, a message indicating that a connected smart antenna 2 capable of two-way communication is not adapted to a predetermined function provided by the TV broadcast receiver 1, if the controller 17 determines it, namely determines the non-adaptation of the connected smart antenna 2 to the predetermined function.

Figure 2:
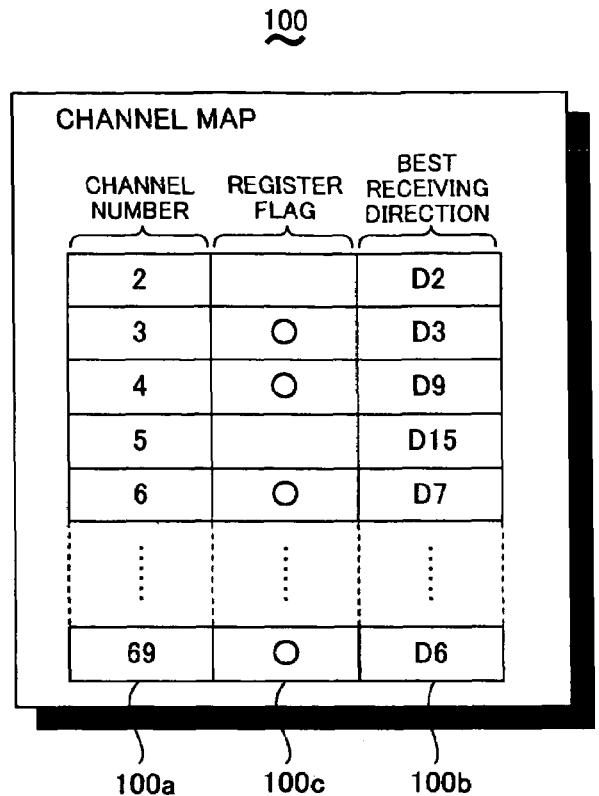
FIG. 2 is a channel map in a tabular form for storing various information.

The memory 15 stores various information including a channel map 100 in a tabular form as shown in FIG. 2, which has information including: channel numbers 100a of respective channels transmitted from respective broadcast stations; best receiving directions 100b of the smart antenna 2 for receiving the respective channels; and registered channel information (register flag) 100c indicating whether or not each channel is registered as a selectable channel. Based on the channel map 100, the controller 17 performs a channel reception process for a channel which is registered in the channel map 100 as a selectable channel. The controller 17 reads, from the memory 15, a best receiving direction 100b of the channel to be selected, and outputs, to the smart antenna 2, a control signal for commanding the best receiving direction 100b so as to command the tuner 11 to select the channel, thereby performing the channel reception process. Note that in the channel map 100 of FIG. 2, the state of a channel registered therein as a selectable channel, which can also be referred to as on-state of register flag, is indicated by a circle "○", while the state of a channel registered therein as an unselectable channel, which can also be referred to as off-state of register flag, is indicated by blank space.

The controller 17 sends a control signal to the antenna controller 22, and receives, from the antenna controller 22, a response signal in response to the control signal, whereby the controller 17 serves as a control signal communication unit. Further, the controller 17 performs an antenna connection determination process including a Mode A antenna connection determining process which are described later, whereby the controller 17 serves a first, a second and a third antenna connection identification unit. Furthermore, the controller 17 sends, to the antenna controller 22, a control signal for or corresponding to each identified smart antenna 2 on the basis of the kind of smart antenna 2 as identified by the antenna connection determination process including the Mode A antenna connection determining process, so as to control the each identified smart antenna 2, whereby the controller 17 serves as an antenna control unit.

Figure 3:
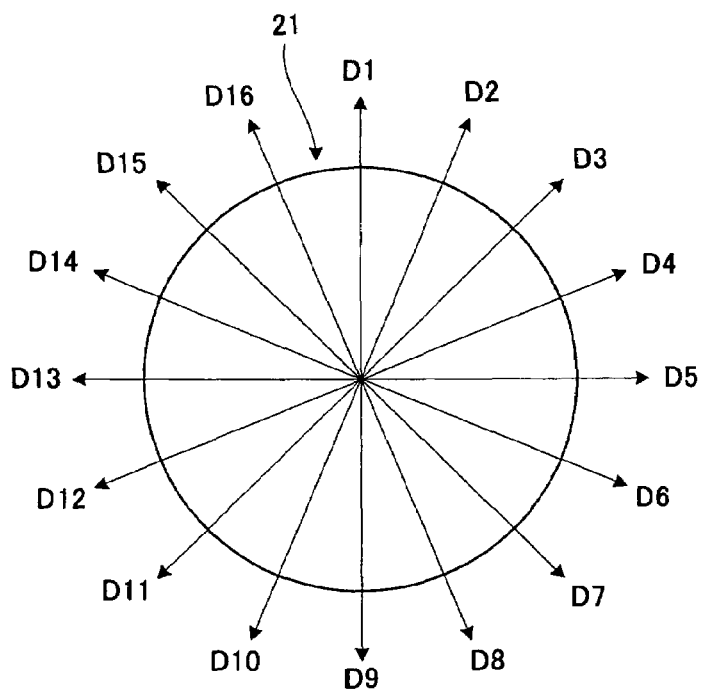
FIG. 3 is a chart showing and explaining multiple receiving directions of a smart antenna connected to the TV broadcast receiver.

FIG. 3 is a chart showing and explaining multiple receiving directions of the smart antenna 2. When connected to the smart antenna 2, the TV broadcast receiver 1 according to the present embodiment receives, and measures receiving conditions of, TV broadcast signals coming from sixteen receiving directions provided in the EIA-909 standard as indicated by D1 to D16 in FIG. 3, respectively. The smart antenna 2 comprises: the antenna unit 21 for receiving TV broadcast signals from the sixteen receiving directions D1 to D16 by mechanically or electronically switching an active receiving direction (namely, making one of the multiple receiving directions active); and the antenna controller 22 for controlling the operation of the antenna unit 21. Based on the receiving direction control signal from the TV broadcast receiver 1, the antenna controller 22 makes active one of the multiple receiving directions D1 to D16 of the antenna unit 21 which is commanded by the control signal.

Figure 4:
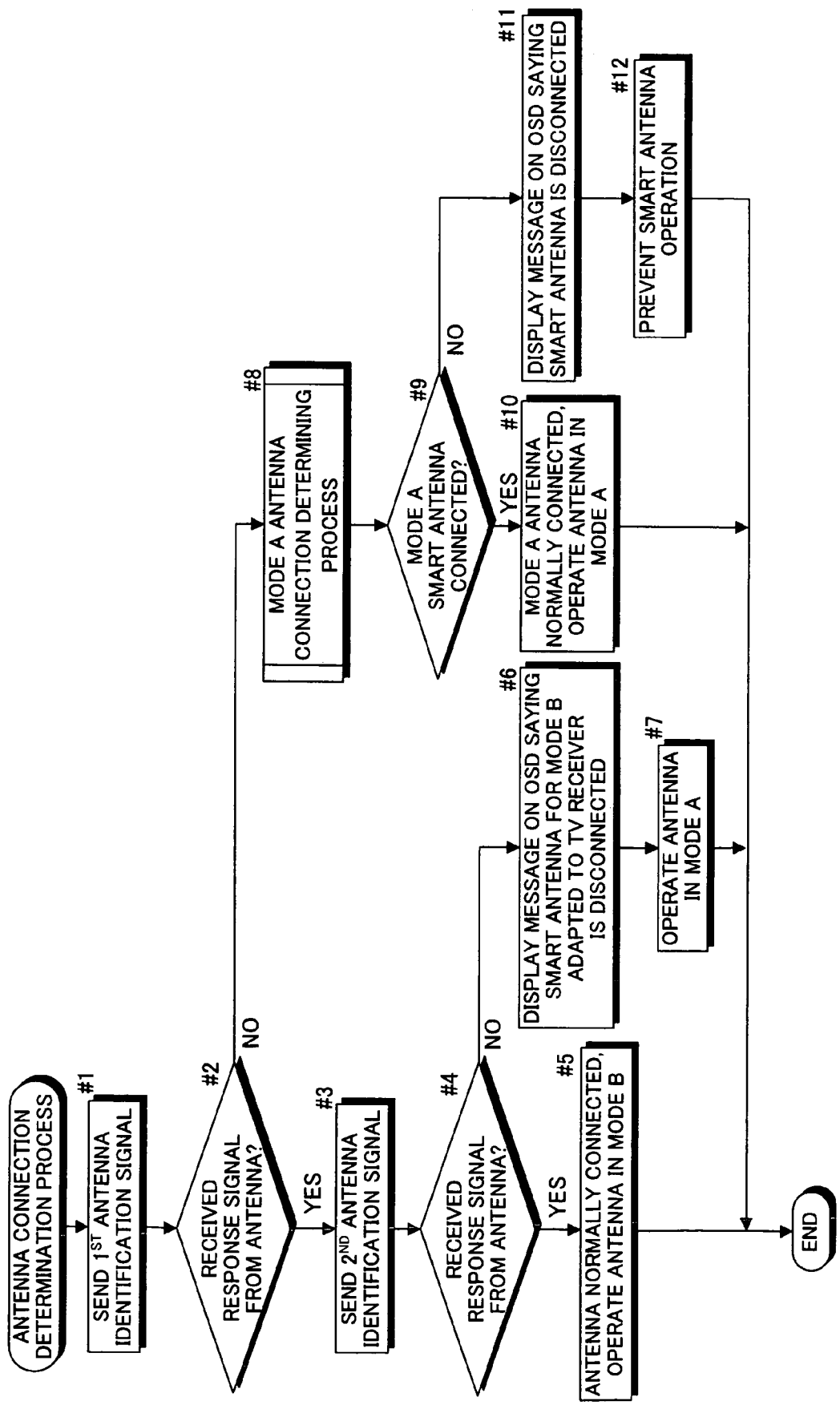
FIG. 4 is a flow chart showing an antenna connection determination process performed by the TV broadcast receiver for identifying an antenna connected to the TV broadcast receiver.

Referring now to the flow chart of FIG. 4, the following describes an antenna connection determination process for determining or identifying an antenna connected to the TV broadcast receiver 1 (more specifically the tuner 11 of the TV broadcast receiver 1). The antenna connection determination process is performed, for example, when a power supply of the TV broadcast receiver 1 is turned on. When the power supply of the TV broadcast receiver 1 is turned on, the controller 17 controls to send, to the antenna controller 22, such a first antenna identification signal according to the EIA-909 standard that the antenna controller 22 sends back a predetermined response signal in response to the first antenna identification signal if a smart antenna 2 for the Mode B (i.e. multi-directional antenna capable of two-way communication) is connected to the TV broadcast receiver 1 (without sending back the predetermined response signal if the smart antenna 2 for the Mode B is disconnected from the TV broadcast receiver 1), in order to determine or identify whether or not the smart antenna 2 for the Mode B is connected to the TV broadcast receiver 1 (#1).

The controller 17 then determines whether the TV broadcast receiver 1 (tuner 11) has received the predetermined response signal from the antenna (antenna controller 22) within a predetermined time, and determines that the smart antenna 2 for the Mode B is connected to the TV broadcast receiver 1, if the TV broadcast receiver 1 has received the predetermined response signal from the antenna within the predetermined time (YES in #2). Thus, the controller 17 serves as a claimed first antenna connection identification unit for identifying or determining the connection of the multi-directional antenna capable of the two-way communication in the above-described manner.

If the controller 17 determines that the smart antenna 2 for the Mode B is connected to the TV broadcast receiver 1 (YES in #2), the controller 17 further controls to send, to the antenna controller 22, such a second antenna identification signal that the antenna controller 22 sends back a predetermined response signal in response to the second antenna identification signal if the smart antenna 2 for the Mode B is adapted to a predetermined function which the TV broadcast receiver 1 provides by using the two-way communication (without sending back the predetermined response signal if the smart antenna 2 for the Mode B is not adapted to the predetermined function), in order to determine or identify whether or not the smart antenna 2 for the Mode B is adapted to such predetermined function (#3). The controller 17 then determines whether the TV broadcast receiver 1 (tuner 11) has received the predetermined response signal from the antenna (antenna controller 22) within a predetermined time.

The controller 17 identifies or determines that the smart antenna 2 for the Mode B adapted to the predetermined function provided by the TV broadcast receiver 1 is correctly or normally connected to the TV broadcast receiver 1, if the TV broadcast receiver 1 has received the predetermined response signal from the antenna within the predetermined time (YES in #4). Thus, the controller 17 serves as a claimed third antenna connection identification unit for identifying or determining the adaptation of the multi-directional antenna to the predetermined function provided by the TV broadcast receiver by using the two-way communication in the above-described manner. The controller 17 controls the connected antenna to operate in the Mode B in subsequent steps by e.g. using such predetermined function (#5).

Figure 6A:
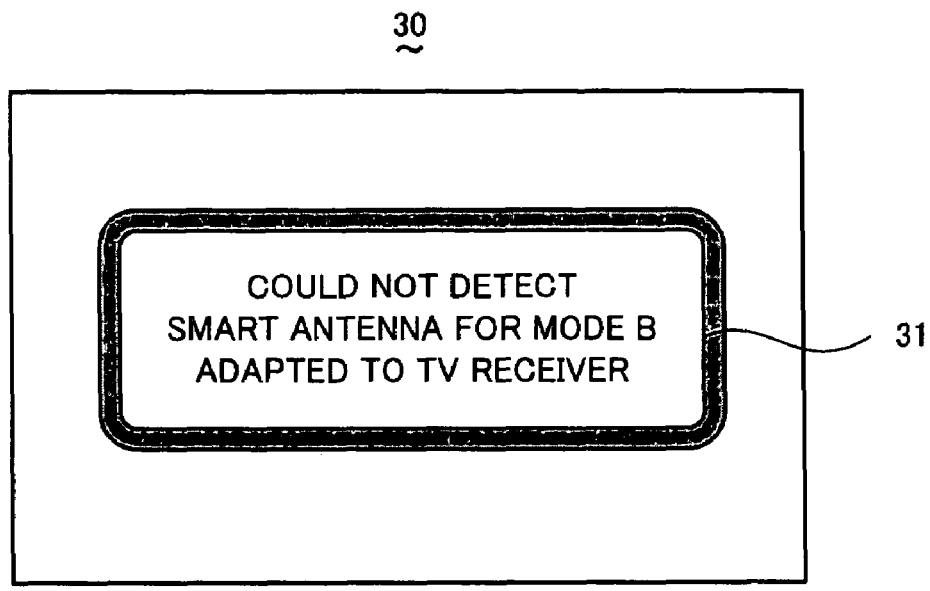
FIG. 6A is a view showing a message displayed on a monitor screen in the antenna connection determination process for a Mode B smart antenna.

On the other hand, if the antenna controller 22 does not send back, and hence the TV broadcast receiver 1 does not receive, the predetermined response signal (i.e. receives no response signal) within the predetermined time (NO in #4), the controller 17 controls the OSD unit 14 to display a message 31 on a monitor screen (OSD) 30 as shown in FIG. 6A, saying that the TV broadcast receiver 1 could not detect a smart antenna for the Mode B adapted to the TV broadcast receiver 1, namely indicating that a smart antenna for the Mode B adapted to the predetermined function provided by the TV broadcast receiver 1 is not connected to the TV broadcast receiver 1 (#6). The controller 17 controls the connected antenna to operate in the Mode A (i.e. as a multi-directional antenna capable of one-way communication) (#7).

Note here that the predetermined function to be provided by the TV broadcast receiver 1 is not limited to a specific one, and can be an optional function that can be provided by using the two-way communication. Furthermore, if the predetermined function provided by the TV broadcast receiver 1 has various versions, it can be designed in a manner that the controller 17 controls to send, to the antenna controller 22, such a second antenna identification signal that the antenna controller 22 sends back a response signal containing version information corresponding to one of the versions of the predetermined function in response to the second antenna identification signal, so that the controller 17 can vary the control of the antenna controller 22 according to the response signal sent back from the antenna controller 22.

Back to the step #2, if the TV broadcast receiver 1 has not received the response signal from the antenna within the predetermined time (NO in #2), the controller 17 determines that a smart antenna for the Mode B is not connected to the TV broadcast receiver 1, and performs a Mode A antenna connection determining process (#8) to determine whether or not a smart antenna 2 for the Mode A is correctly connected thereto.

Figure 5:
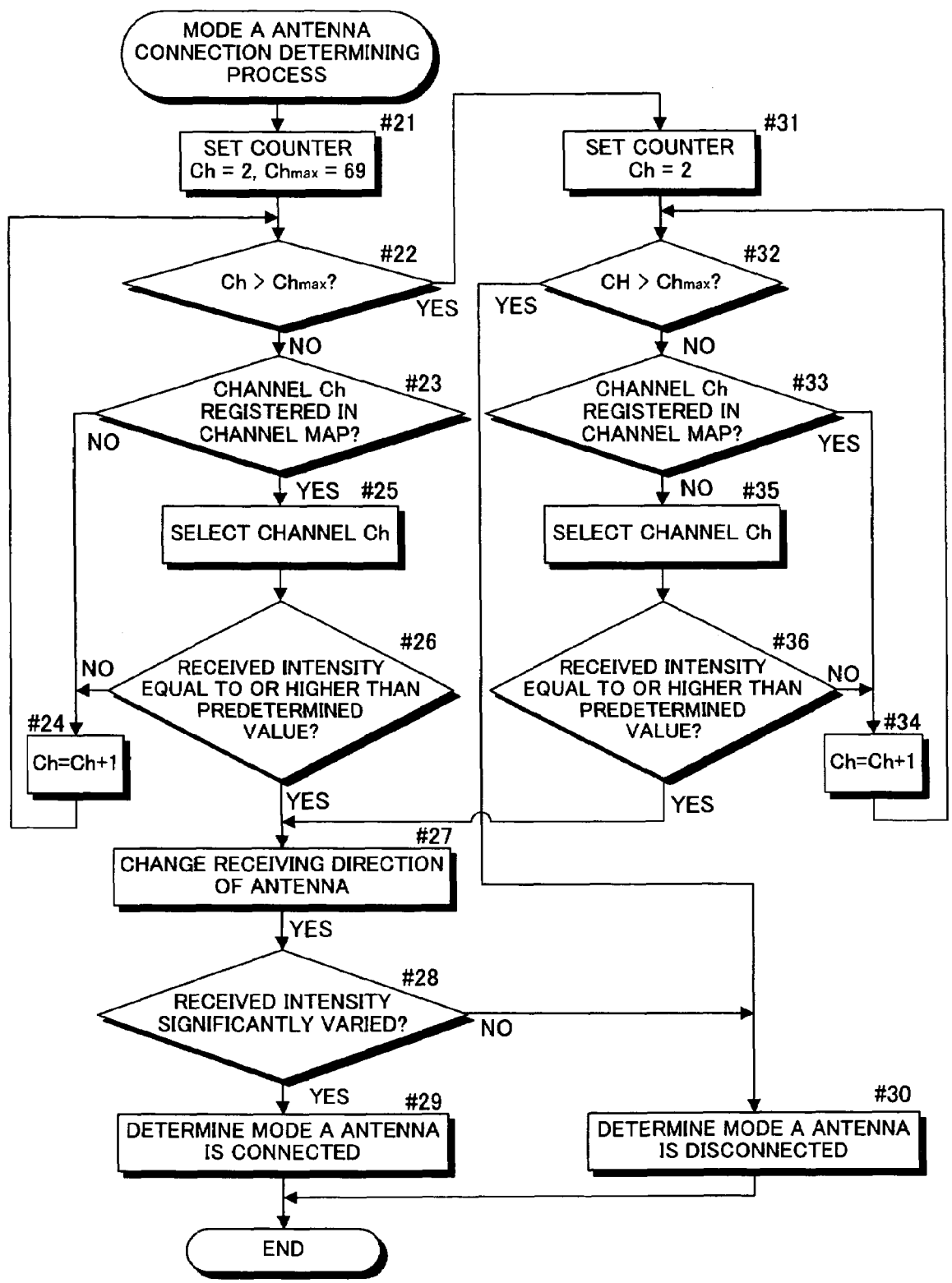
FIG. 5 is a flow chart showing a Mode A antenna connection determining process performed by the TV broadcast receiver.

Referring now to the flow chart of FIG. 5, the Mode A antenna connection determining process in the step #8 will be described. Briefly, in the Mode A antenna connection determining process, the controller 17 uses a channel registered in the channel map 100 as a selectable channel (such as channel 3, channel 4 or channel 6 in FIG. 2) to determine or identify whether or not a smart antenna 2 for the Mode A is connected to the TV broadcast receiver 1 (#21 to #30). If thereby the controller 17 is unable to make the determination (NO in #22), the controller 17 uses a channel which is not registered in the channel map 100 (such as channel 2 or channel 5 in FIG. 2), in order to determine whether or not a smart antenna 2 for the Mode A is connected to the TV broadcast receiver 1 (#31 to #36, and #27 to #30). This will be described in detail below.

When the Mode A antenna connection determining process is started, the controller 17 sets a channel Ch to be determined, or to be used for the determination, and a maximum value Chmax of channel (more specifically sets a counter at Ch=2 and Chmax=69) (#21). The controller 17 then determines whether or not the value (in the counter) of the channel Ch to be used for the determination is larger than the maximum value Chmax (#22). If the value of the channel Ch to be used for the determination is not larger than the maximum value Chmax (NO in #22) (namely, if all the channels have not been subjected to the following steps #23 to #26), the controller 17 determines whether or not the channel Ch is registered in the channel map 100 (#23). If the channel Ch is not registered in the channel map 100 (NO in #23), the controller 17 increments the value (in the counter) of the channel Ch (#24), and performs the steps #22 and #23 for each subsequent channel.

On the other hand, if the channel Ch is registered in the channel map 100 (YES in #23), the controller 17 controls the tuner 11 to select the channel Ch and receive a TV broadcast signal of the channel Ch (#25). The controller 17 then further controls the tuner 11 to measure the intensity of the received TV broadcast signal so as to determine whether or not the intensity of the received TV broadcast signal is equal to or higher that a predetermined value (#26). If the intensity is lower than the predetermined value (NO in #26), the controller 17 increments the value (in the counter) of the channel Ch (#24), and performs the steps #22 and #26 for each subsequent channel.

If, on the other hand, the intensity of the received TV broadcast signal of the channel Ch is equal to or higher than the predetermined value (YES in #26), the controller 17 controls to send, to the antenna controller 22, a control signal to change or switch the active receiving direction (i.e. the current active receiving direction) of the antenna to a further active receiving direction (#27). The controller 17 further controls the tuner 11 to receive, and measure the intensity of, the TV broadcast signal in the further active receiving direction so as to determine whether or not the thus measured intensity of the TV broadcast signal is significantly varied (i.e. varied by an amount greater than a predetermined amount) from that in the current active receiving direction, i.e. from the intensity of the TV broadcast signal received and measured in the step #26 (#28).

If the former intensity is significantly varied from the latter intensity (YES in #28), the controller 17 determines that the active receiving direction of the antenna has been changed on the basis of the control signal sent in the step #27, and thereby determines or identifies that a smart antenna 2 for the Mode A is connected to the TV broadcast receiver 1 (#29). Thus, the controller 17 serves as a claimed second antenna connection identification unit for identifying or determining the connection of the multi-directional antenna capable of the one-way communication in the above-described manner. On the other hand, if the former intensity is not significantly varied from the latter intensity (i.e. is the same as, or is varied by an amount within a predetermined amount from the latter intensity) (NO in #28), the controller 17 determines that the active receiving direction (the current active receiving direction) of the antenna has not been changed on the basis of the control signal sent in the step #27, and thereby determines or identifies that a smart antenna 2 for the Mode A is disconnected from or not connected to the TV broadcast receiver 1 (#30). Thereby, it is determined in this case that the Yagi antenna 20 having a single receiving direction is connected to the TV broadcast receiver 1.

Back to the step #22 with the step #26, if the value of the channel Ch to be used for the determination is larger than the maximum value Chmax (NO in #26 and YES in #22) (namely, if the intensities of the received TV broadcast signals of all the channels Ch are lower than the predetermined value), the controller 17 resets the value of channel Ch (#31) and performs steps #32 to #36 for the reset channel which is not registered as a selectable channel in the map 100. Here, the steps #32 to #36 correspond to the steps #22 to #26, except that the steps #32 to #36 are for channels not registered as selectable channels in the channel map 100, whereas the steps #22 to #26 are for channels registered as selectable channels in the channel map 100.

Thereafter, the controller 17 performs the steps #27 to #29 for a channel Ch whose intensity of received TV broadcast signal is equal to or higher than the predetermined value. More specifically, when the controller 17 detects a channel Ch whose intensity of received TV broadcast signal is equal to or higher than the predetermined value (YES in #36), the controller 17 changes the (current) active receiving direction of the antenna (#27), and determines whether or not a smart antenna 2 for the Mode A is connected to the TV broadcast receiver 1 (#28 and #29) in a manner as described above. On the other hand, if the intensities of the received TV broadcast signals of all the channels Ch unregistered in the channel map 100 are lower than the predetermined value (NO in #36 and YES in #32), the controller 17 determines that a smart antenna 2 for the Mode A is disconnected from or not connected to the TV broadcast receiver 1 (#30). Thereby, it is determined or identified in this case that the Yagi antenna 20 having a single receiving direction is connected to the TV broadcast receiver 1.

Figure 6B:
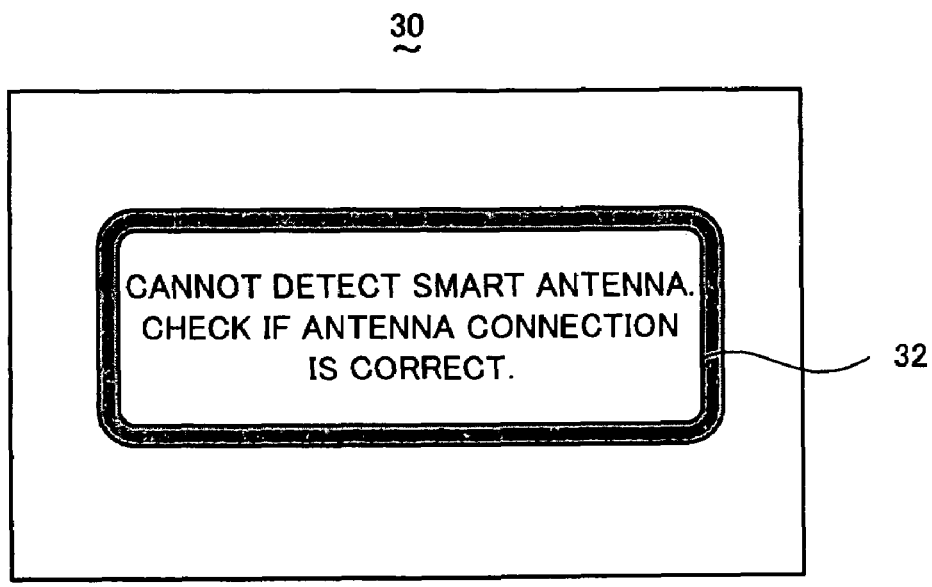
FIG. 6B is a view showing a message displayed on the monitor screen in the Mode A antenna connection determining process for a Mode A smart antenna.

Referring back to the flow chart of FIG. 4, when the Mode A antenna connection determining process (#8 and FIG. 5) ends, the controller 17 determines whether or not a smart antenna 2 for the Mode A is connected to the TV broadcast receiver 1 (#9). If the controller 17 determines that a smart antenna 2 for the Mode A is connected to the TV broadcast receiver 1 (YES in #9), the controller 17 assumes that the smart antenna 2 for the Mode A is correctly connected to the TV broadcast receiver 1, and controls the antenna to operate in the Mode A (#10). On the other hand, if the controller 17 determines that a smart antenna 2 for the Mode A is disconnected from or not connected to the TV broadcast receiver 1 (NO in #9), the controller 17 controls the OSD unit 14 to display a message 32 on a monitor screen (OSD) 30 as shown in FIG. 6B, saying that the TV broadcast receiver 1 could not detect a smart antenna, and the user should check whether or not the antenna connection is correct, namely indicating that a smart antenna is disconnected from or not connected to the TV broadcast receiver 1 (#11). The controller 17 prevents any control operation to control a smart antenna (#12).

As described in the foregoing, the TV broadcast receiver 1 according to the present embodiment performs the antenna connection determination process including the Mode A antenna connection determining process so as to determine whether or not a smart antenna 2 is connected to the TV broadcast receiver 1. The TV broadcast receiver 1 further controls the OSD unit 14 to display a message 32 on the monitor screen 30 indicating that a smart antenna 2 is disconnected from the TV broadcast receiver 1 if the TV broadcast receiver 1 determines that the kind of antenna connected thereto is not a smart antenna 2. Thus, a user can easily recognize the kind of antenna connected to the TV broadcast receiver 1. Here, if the TV broadcast receiver 1 displays a message indicating that a smart antenna 2 is disconnected from the TV broadcast receiver 1 even though a smart antenna 2 is actually connected to the TV broadcast receive 1, the user can thereby recognize that the smart antenna 2 is not correctly or normally corrected (i.e. is incorrectly connected).

Furthermore, the TV broadcast receiver 1 performs the antenna connection determination process so as to determine whether or not a smart antenna 2 connected to the TV broadcast receiver 1 is adapted to a predetermined function provided by the TV broadcast receiver 1. If the TV broadcast receiver 1 determines that the smart antenna 2 is not adapted to the predetermined function, the TV broadcast receiver 1 controls the OSD unit 14 to display a message indicating the non-adaptation on the monitor screen 30. Thus, a user can easily recognize whether or not the connected smart antenna 2 is adapted to the function provided by the TV broadcast receiver 1. In addition, the controller 17 sends, to the antenna controller 22, a control signal for or corresponding to each identified smart antenna 2 on the basis of the kind of antenna identified or determined by the antenna connection determination process including the Mode A antenna connection determining process, so as to control the each identified smart antenna 2 (the controller 17 thereby serving as an antenna control unit). Accordingly, when receiving terrestrial broadcast, the TV broadcast receiver 1 can properly control the smart antenna 2 according to the kind of smart antenna 2.

It is to be noted that the present invention is not limited to the above embodiments, and various modifications are possible. For example, in the above-described embodiment, the antenna unit 21 and the antenna controller 22 are provided as separate elements from each other. However, it is possible, for example, to provide the antenna controller 22 integrally with the antenna unit 21 or the TV broadcast receiver 1.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A television broadcast receiver comprising:
a television broadcast signal receiving unit connected via an RF terminal to a unidirectional antenna having a single receiving direction, or to a multi-directional antenna having multiple receiving directions, for receiving a television broadcast signal;
a control signal communication unit connected via a control signal input/output terminal to an antenna controller of the multi-directional antenna for sending a control signal to the antenna controller, and for receiving a response signal from the antenna controller in response to the control signal, in which the antenna controller is provided to change an active receiving direction of the multi-directional antenna;
a first antenna connection identification unit for identifying the kind of antenna connected to the RF terminal and/or the control signal input/output terminal, whether the multi-directional antenna is capable of the two-way communication or not, by communication using the control signal communication unit to send a first antenna identification signal to the antenna controller of the connected antenna which sends back a response signal if a multi-directional antenna capable of the two-way communication is connected to the television broadcast signal receiving unit, so as to determine that the multi-directional antenna capable of the two-way communication is connected to the television broadcast signal receiving unit if the first antenna connection identification unit receives the response signal, and to determine that the multi-directional antenna capable of the two-way communication is disconnected from the television broadcast signal receiving unit if the first antenna connection identification unit does not receive the response signal;
a second antenna connection identification unit for identifying whether or not a multi-directional antenna capable of one-way communication and having a current active receiving direction is connected to the television broadcast signal receiving unit if the first antenna connection identification unit identifies that the multi-directional antenna capable of the two-way communication is disconnected from the television broadcast signal receiving unit, in which the second antenna connection identification unit performs the identification by communication using the control signal communication unit to send, to the connected antenna, a control signal to change the current active receiving direction of the multi-directional antenna to a further active receiving direction, so as to determine that the multi-directional antenna capable of the one-way communication is connected to the television broadcast signal receiving unit if intensity of a television broadcast signal received and measured in the further active receiving direction is significantly varied from that in the current receiving direction, and to determine that the multi-directional antenna capable of the one-way communication is disconnected from the television broadcast signal receiving unit if the intensity of the television broadcast signal received and measured in the further active receiving direction is not significantly varied from that in the current receiving direction;
a message display unit for displaying, to a user, a message indicating that a multi-directional antenna is disconnected from the television broadcast signal receiving unit if the identification by the first antenna connection identification unit and the second antenna connection identification unit indicates that the kind of antenna connected to the television broadcast signal receiving unit is not a multi-directional; and
an antenna control unit for sending, to the antenna controller, a control signal for each multi-directional antenna using the control signal communication unit on the basis of the kind of multi-directional antenna as identified by the first antenna connection identification unit and the second antenna connection identification unit, so as to control the each identified multi-directional antenna.

2. A television broadcast receiver comprising:
a television broadcast signal receiving unit connected via an RF terminal to a unidirectional antenna having a single receiving direction, or to a multi-directional antenna having multiple receiving directions, for receiving a television broadcast signal;
a control signal communication unit connected via a control signal input/output terminal to an antenna controller of the multi-directional antenna for sending a control signal to the antenna controller, and for receiving a response signal from the antenna controller in response to the control signal, in which the antenna controller is provided to change receiving direction of the multi-directional antenna;
a first antenna connection identification unit for identifying the kind of antenna connected to the RF terminal and/or the control signal input/output terminal, whether multi-directional antenna capable of the two-way communication or not, by communication using the control signal communication unit to send a first antenna identification signal to the antenna controller of the connected antenna which sends back a response signal to the first antenna identification signal if a multi-directional antenna capable of the two-way communication is connected to the television broadcast signal receiving unit, so as to determine that the multi-directional antenna capable of the two-way communication is connected to the television broadcast signal receiving unit if the first antenna connection identification unit receives the response signal, and to determine that the multi-directional antenna capable of the two-way communication is disconnected from the television broadcast signal receiving unit if the first antenna connection identification unit does not receive the response signal;

a second antenna connection identification unit for identifying whether or not a multi-directional antenna capable of one-way communication and having a current active receiving direction is connected to the television broadcast signal receiving unit if the first antenna connection identification unit identifies that the multi-directional antenna capable of the two-way communication is disconnected from the television broadcast signal receiving unit, in which the second antenna connection identification unit performs the identification by communication using the control signal communication unit to send, to the connected antenna, a control signal to change the current active receiving direction of the multi-directional antenna to a further active receiving direction, so as to determine that the multi-directional antenna capable of the one-way communication is connected to the television broadcast signal receiving unit if intensity of a television broadcast signal received and measured in the further active receiving direction is significantly varied from that in the current receiving direction, and to determine that the multi-directional antenna capable of the one-way communication is disconnected from the television broadcast signal receiving unit if the intensity of the television broadcast signal received and measured in the further active receiving direction is not significantly varied from that in the current receiving direction;

a third antenna connection identification unit for identifying whether or not the multi-directional antenna capable of the two-way communication is adapted to a predetermined function provided by the television broadcast receiver by using the two-way communication if the first antenna connection identification unit identifies that the multi-directional antenna of the two-way communication is connected to the television broadcast signal receiving unit, in which the third antenna connection identification unit performs the identification by communication using the control signal communication unit to send a second antenna identification signal to the antenna controller of the connected multi-directional antenna which sends back a response signal to the second antenna identification signal if the connected multi-directional antenna is adapted to the predetermined function, so as to determine that the multi-directional antenna capable of the two-way communication and adapted to the predetermined function is connected to the television broadcast signal receiving unit if the third antenna connection identification unit receives the response signal, and to determine that the multi-directional antenna capable of the two-way communication and adapted to the predetermined function is disconnected from the television broadcast signal receiving unit if the third antenna connection identification unit does not receive the response signal;

a first message display unit for displaying, to a user, a message indicating that a multi-directional antenna is disconnected from the television broadcast signal receiving unit if the identification by the first antenna connection identification unit and the second antenna connection identification unit indicates that the kind of antenna connected to the television broadcast signal receiving unit is not a multi-directional antenna;

a second message display unit for displaying, to a user, a message indicating that a multi-directional antenna capable of the two-way communication and adapted to the predetermined function is disconnected from the television broadcast signal receiving unit if the identification by the third antenna connection identification unit indicates that the kind of antenna connected to the television broadcast signal receiving unit is not a multi-directional antenna capable of the two-way communication and adapted to the predetermined function; and an antenna control unit for sending, to the antenna controller, a control signal for each multi-directional antenna using the control signal communication unit on the basis of the kind of multi-directional antenna as identified by the first antenna connection identification unit, the second antenna connection identification unit and the third antenna connection identification unit, so as to control the each identified multi-directional antenna.

* * * * *